United States Patent

Øiestad

[11] Patent Number: 5,802,805
[45] Date of Patent: Sep. 8, 1998

[54] COMBINED COMPRESSION AND PACKAGING MACHINE FOR CYLINDRICAL OBJECTS

[76] Inventor: Jens Øiestad, Vestre Øiestad Gård, N-4880 Rykene, Norway

[21] Appl. No.: 809,231
[22] PCT Filed: Jun. 13, 1995
[86] PCT No.: PCT/NO95/00099
§ 371 Date: Mar. 18, 1997
§ 102(e) Date: Mar. 18, 1997
[87] PCT Pub. No.: WO96/08957
PCT Pub. Date: Mar. 28, 1996

[30] Foreign Application Priority Data

Sep. 21, 1994 [NO] Norway ........................... 943506

[51] Int. Cl.$^6$ .............................. B65B 11/04; B65B 11/58
[52] U.S. Cl. ......................... 53/176; 53/211; 53/118
[58] Field of Search ................... 53/210, 211, 214, 53/215, 118, 529, 176

[56] References Cited

U.S. PATENT DOCUMENTS

| 1,654,258 | 12/1927 | Hooper | 53/211 |
| 4,685,270 | 8/1987 | Brambilla | 53/211 X |
| 4,841,851 | 6/1989 | Quataert | 53/118 X |

FOREIGN PATENT DOCUMENTS

| 0 110 110 | 6/1984 | European Pat. Off. | |
| 87970 | 12/1992 | Finland . | |
| 38 05 224 | 8/1989 | Germany . | |
| 41 20 733 | 1/1993 | Germany . | |
| 2056401 | 3/1981 | United Kingdom | 53/211 |
| 2 102 335 | 2/1983 | United Kingdom . | |
| 2188587 | 10/1987 | United Kingdom | 53/118 |

Primary Examiner—Linda Johnson
Attorney, Agent, or Firm—Browdy and Neimark

[57] ABSTRACT

A pressing and baling machine (1) for compression of vegetable fibres into a compressed round bale (7) comprises a frame (2), on which is assembled a pressing chamber (5, 6) equipped on its internal circumference with rotatable rolls (15) for rotation and pressing of the bale (7). The pressing chamber (5, 6) consists of a lower chamber part (5) and an upper chamber part (6) which are displaceable in relation to each other so as to free an area of the bale (7) allowing the body to be packaged in elastic plastic foil. The lower pressing chamber part (5) is connected to a lower frame section (3). The upper chamber part (6) is connected to an upper frame section (4), and two frame sections (3, 4) are displaceably interconnected. The upper chamber part (6) is rotatably supported in relation to the frame (2) around a vertical axis (9) when the chamber parts are at a distance from each other. At least one retaining arm (11) is attached to the pressing chamber part (7) for a roll (13) of packaging material, for packaging of the bale (7), so that the retaining arm (7) rotates with the upper chamber part (6) and during rotation issues packaging material to the bale (7).

21 Claims, 3 Drawing Sheets

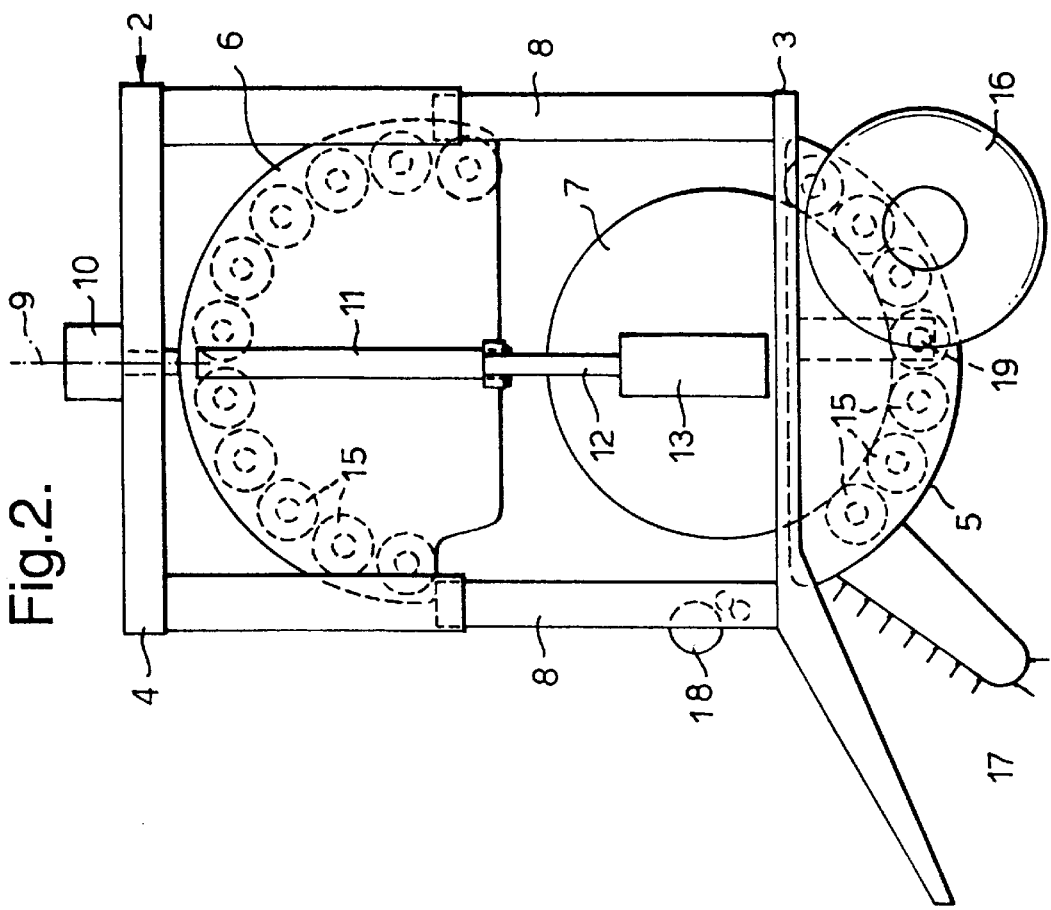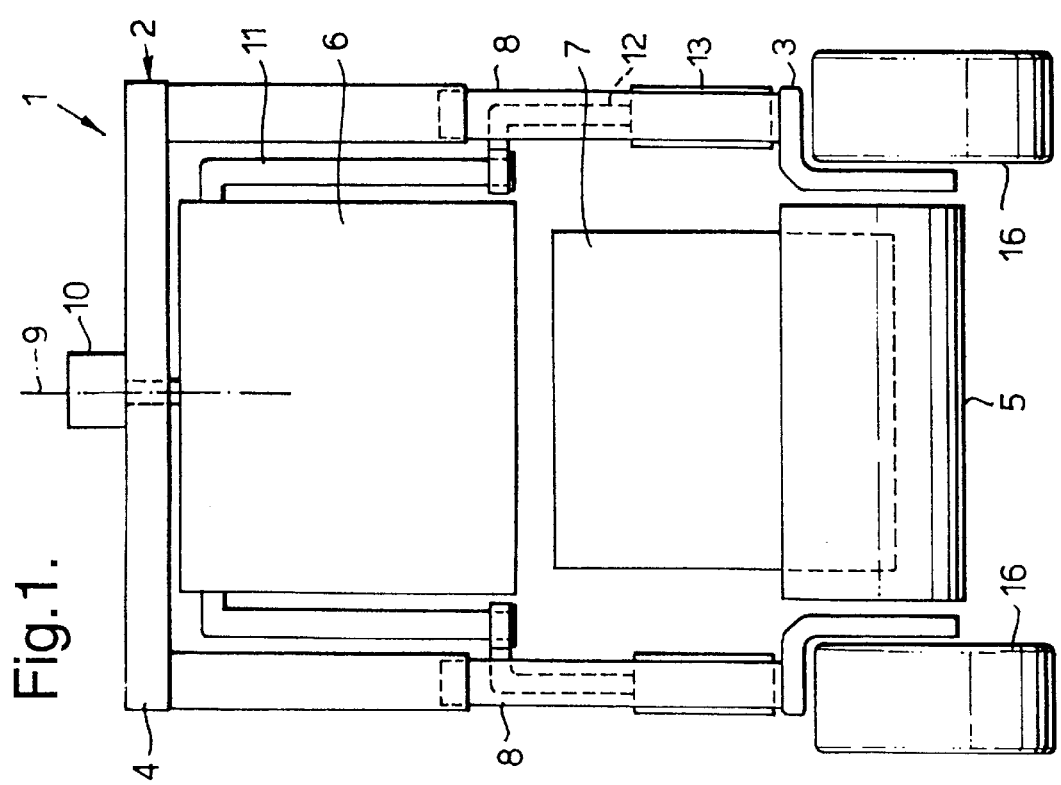

COMBINED COMPRESSION AND PACKAGING MACHINE FOR CYLINDRICAL OBJECTS

In recent years we have seen a widespread trend of individually wrapping so-called round bales or other large bales of semi-dried grass in plastic foil based on natural anaerobic lactic acid fermentation, optionally with the addition of inhibitors to reinforce the production of lactic acid. This has more or less revolutionized fodder collection for cattle and other livestock able to digest this excellent fodder. The present invention relates to a device for the compression and packaging of such loose mass.

Previously this was a multi-step operation, including mowing, conditioning/cutting, turning, raking, compressing, ejection of a compressed bale on the meadow, transporting the compressed bale to the storage location, packaging the compressed bale in plastic using a separate machine, tipping the packaged bale, picking up and optionally stacking the packaged bale in a storage location using suitable bale handling equipment.

Devices are known from the prier art allowing compression and packaging by one single machine. One such example is shown in DE 3.805.224, which shows a compression and packaging machine whose pressing chamber is equipped with driveable rolls for turning the bale around a horizontal axis. The pressing chamber comprises an upper and lower section. The upper section may be vertically lifted so as to free an area around the middle section of the bale. The device is also equipped with a winding arm carrying a roll of plastic. The arm is rotatable around the vertical axis so as to wrap several layers of plastic around the bale. At the same time, the rolls are driven in the lower section of the chamber causing the bale to rotate slowly around a horizontal axis.

This device is not very useful in practice, due to its size.

The winding arm has to move beyond the outermost point (corner) of the upper pressing chamber. This requires the arm to extend quite far out from the axis of rotation; far beyond the outermost point of the bale, which requires the outer dimensions of the device to be undesirably large.

Moreover, the lifting of the upper chamber section requires lifting cylinders which tower well above the machine itself. These will easily get in the way, for instance when the device is needed inside a barn etc., where the ceiling height is limited.

The present invention is envisaged as integrating a number of the above-mentioned operations in one single operation, which will reduce labour consumption dramatically in the case of individual packaging of large bales e.g. of grass for farmers and agricultural contractors. In any case, it will be possible for just one man and a tractor to perform compression and packaging in one operation, which would be extremely useful to contractors. At the same time, the invention is intended to simplify the structural design of the device, making it more compact and reliable.

The present invention achieves a much more compact device. The large external dimensions resulting from a non-rotating upper chamber are avoided by placing the winding arms on the upper half of the chamber as close to the axis of rotation as possible, where they rotate with the upper half of the chamber.

Since the frame of the device is split, it is possible to place the lifting cylinders in the actual frame structure, thus avoiding the towering lifting cylinders.

The invention will now be described in detail with reference to the enclosed drawings, where:

FIG. 1 shows a rear view of the device in packaging position,

FIG. 2 shows the same in side view,

Figure 3:
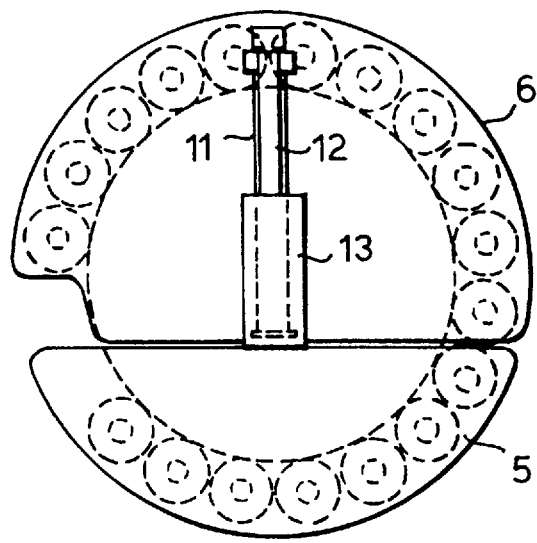
FIG. 3 shows a side view of the device in compression position.

FIG. 1 shows a compression and packaging device 1 consisting of a frame 2 divided into a lower 3 and an upper 4 half of the frame. Supported in the frame 2 are a lower pressing chamber 5 and an upper pressing chamber 6. There is room between the said pressing chambers for a bale 7 to be compressed and packaged.

The upper half 4 of the frame may be raised or lowered in relation to the lower half 3 of the frame by means of hydraulic cylinders 8, for example two such cylinders.

The upper pressing chamber 6 is moreover rotatably supported in the upper half 4 of the frame around an axis 9 by such means as an electrical motor 10. Attached to the upper pressing chamber on its sides are at least one and preferably two winding or retaining arms 11, in such a way that these are located as close as possible to the axis 9.

The arms 11 each support on their outer ends 12 a roll of foil 13. The arms 11 and the rolls of foil 13 rotate with the upper pressing chamber during the rotation of the said chamber around the axis 9, and the arms 11 with the rolls of foil 13 describe a cylinder, the outer surface 14 of which (see FIG. 4) is located inside of the cylinders 8. It is not necessary, however, for the surface 14 to be within the frame 2 at its sides, but here it can pass through openings in the frame, thus the outer dimensions of the frame 2 may be further reduced.

The upper and lower pressing chambers 5, 6 are equipped in the conventional way with a number of rolls 15 at its in-turned surfaces. These are driveable so as, firstly, to compress the bale, and subsequently to turn the bale during packaging.

The device may further have equipment such as wheels 16, a collection apparatus 17 (see FIG. 2) for grass etc., and a roll 18 suited to packaging the Jackets of the bale prior to packaging by means of the rolls of foil 13.

FIG. 3 shows the position when the pressing chamber part 6 is in the lowered position. The arms 11 are telescopic so as to contract either by active operation of the contraction, e.g. by means of hydraulics, or by the rolls 13 hitting a rest when the chamber 6 is lowered, thus causing the arms 11 to contract.

Figure 4:
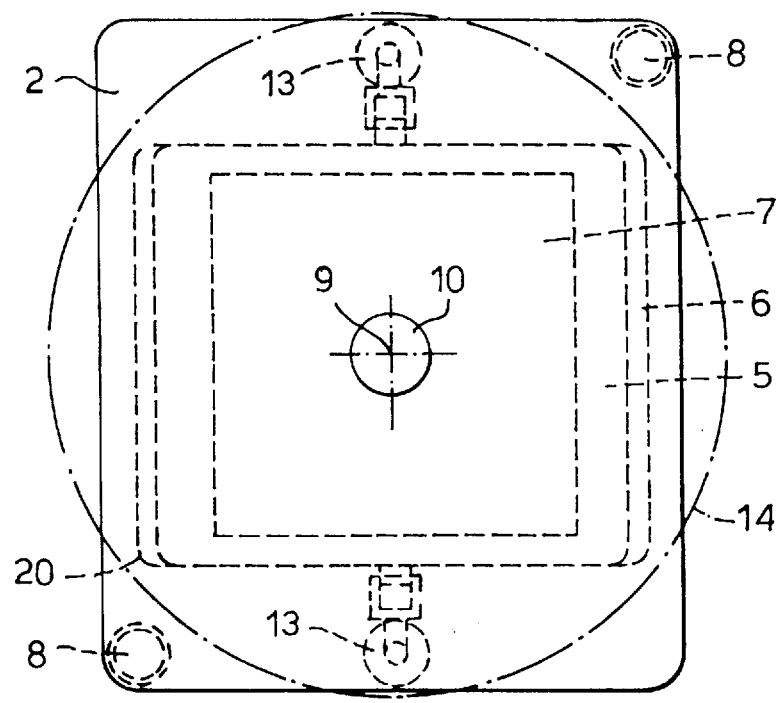
FIG. 4 shows the device in plan view.

FIG. 4 shows a plan view of the device. The chamber 6 is here turned 90° in relation to the chamber 5. It can be seen here that the circle 14 described by the rolls 13 falls within the cylinders 8. If the chamber 6 were to stand still while the arms 11 rotated, the rolls 13 could not pass the corner 20 of the chamber 6. Thus the arms would have to be placed considerably further out from the axis of rotation 9, which would again mean that the cylinders 8 would have to be moved further out, causing an increase to the outer dimensions of the frame 2.

In all essentials, the device of the invention functions as described below.

A grass meadow is mowed at noon on day 1. This time is chosen because the sugar content of the grass during a 24-hour period peaks at that time. If the weather is normal, the mown hay will be ready for compression approximately 24 hours later, when the dry solids content of the grass is between 30–50% dry solids, which is within the limits of adequate lactic acid fermentation, with a minimal risk of formation of butter, acetous fermentation or mould. The device 1 according to the present invention is run out into the field to pick up the mown hay by means of a so-called pick-up 17 or some other collection method such as injection into the chamber 5, 6.

Before the collected material is led into the rotating pressing chamber 5, 6, during simultaneous pressing of the material already in the chamber 5,6 by rotation of the rolls 15 in the same direction, it may be advantageous to cut the material into lengths of 5–15 cm, which gives a dramatic increase in the density of the bale 7, thus reducing air content and adding kilograms to the weight of the dry solids in the bales 7, which is highly advantageous with a view to plastic consumption, quality of the fodder and assured fermentation.

When the mass in the chamber 5,6 has reached the desired density, the end of a roll 18 of plastic film or similar is led into the baling chamber 5,6, which is drawn into the chamber by means of the rotation rolls 15, enveloping the compressed bale 7 at its jacket surface. After 2–4 revolutions, the said film is cut automatically with a cutting/retaining device (not shown).

In the case of long unsegmented grass, it is not necessary to wrap the jacket surface if the rotation of the rolls 15 in the lower chamber 5 is delayed until the rolls 15 in the upper chamber 6 have turned ½–1 revolution. This dispenses with the need for separate jacket wrapping, thus saving even more time, although plastic consumption will increase somewhat.

The upper frame section 4 is then vertically raised by means of e.g. the lifting cylinders 8, achieving a distance greater than the width of the packaging film between the chambers 5, 6. The ends of the packaging film are retained by means of a retaining/cutting mechanism (not shown) and the upper pressing chamber 6 with the plastic wrapping arm(s) 11 rigidly attached thereto is set in rotation around the vertical axis 9. The plastic now runs off the roll(s) 13 and is wrapped around the bale 7, while at the same time the rolls 15 of the lower pressing chamber 5 ensure rotation of the bale 7 around its horizontal longitudinal axis. This chamber 5 should rotate at a speed allowing just over 50% overlap of the width of the packaging film per full revolution of the upper chamber 6.

When the bale 7 has been wrapped in the desired number of layers, rotation of the upper chamber 6 is stopped in a position where the upper frame section 4 with the upper chamber 6 when lowered will hit the lower chamber 5 in compression position. The cutting/retaining mechanism for the packaging plastic is triggered, the film is cut at the bale side of the cutting/retaining mechanism, the upper frame section 4 with the upper chamber 6 is raised again, the end of the film on film rolls 13 are retained while the lower chamber 5 is tipped backwards around a point of rotation 19 at the bottom of the pressing chamber 5, and the bale 7 rolls out onto the ground, where a tractor with the appropriate equipment picks up the ready-packaged 5 bale without damaging the packaging, for storage at the edge of the field or at the place of feeding.

Figure 5:
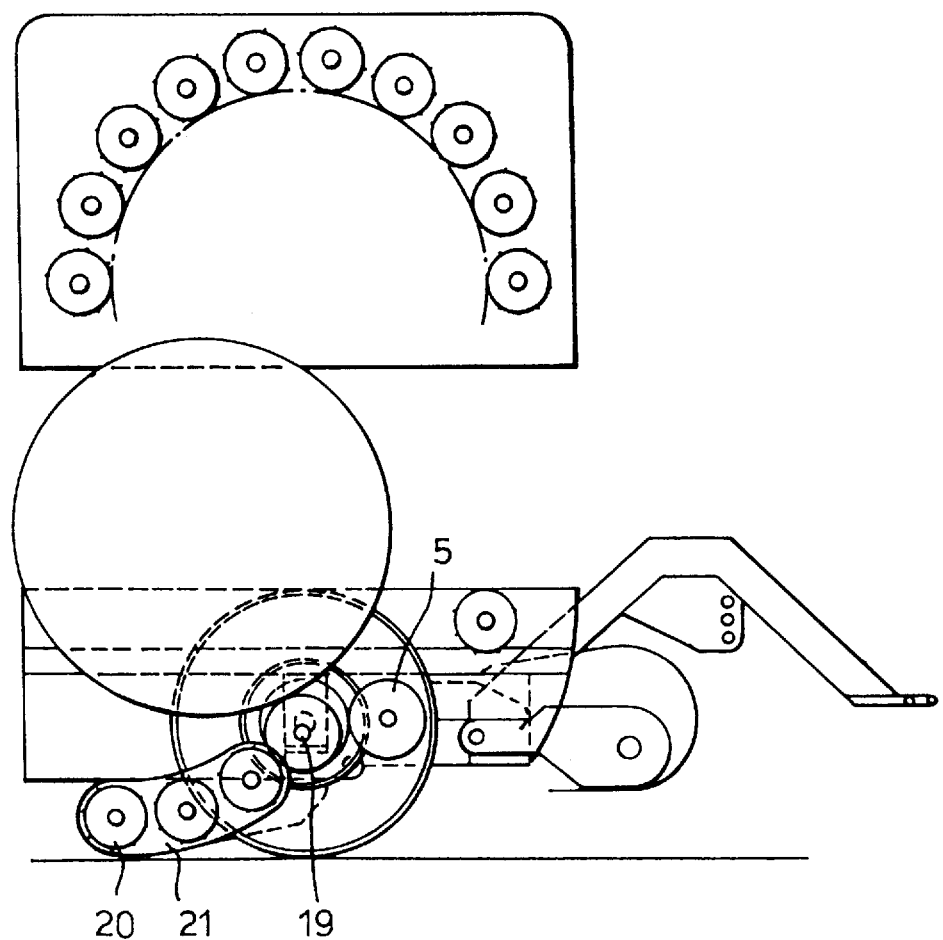
FIG. 5 shows another embodiment of the device with the ejector mechanism.

FIG. 5 shows an alternative and preferred embodiment of the ejector mechanism. Here only that part of the lower chamber with the rolls 20 located behind the lowest point of the lower chamber 5 is lowered. The bale will then roll out of the chamber 5 purely through gravity.

The upper frame section 4 is lowered again allowing the chamber parts 5,6 to meet in pressing position and to be pressed mechanically together to form a round closed chamber with only one input opening for material for pressing. The compression packer is now ready for a new cycle.

In the device of the invention, the upper pressing chamber part is supported horizontally rotatably in the pertaining upper frame section, and one or more (preferably two) retaining arms for a plastic foil roll are attached, for example telescopically, to the upper pressing chamber.

By attaching the winding/retaining arms to the side of the chamber part nearest to the rotary axis of the chamber part, the retaining arms and the rolls of foil will not require any increase in the outer dimensions of the frame.

Furthermore, the upper pressing chamber will be in rotary balance by the use of two diametrically placed foil rolls, thus achieving a high rate of revolutions without wide lateral movements. This ensures rapid and efficient packaging of the pressed body.

Another advantage lies in the unvaried position of the pressed body in relation to the plastic rolls, avoiding the drawback of horizontal migration during the packaging operation.

Another disadvantage of separate pressing and packaging if too much time passes between the two, is overheating (leading to loss of nutrition) and deformation of the bale with subsequent problems during plastic packaging. In the present invention, a 24-hour period or even hours never pass between pressing and packaging, as it is only a matter of seconds between work operations.

If the ground is very wet, separate treatment tends to soil the bale inside and out with muddy water and dirt while the bale is resting unwrapped on the ground and during closing and transportation before packaging, leading to misfermentation of butyric acid bacteria or, in the worst case, clostridia (compost bacteria).

Driving of the pressing device is envisaged through the point of rotation of the lower pressing chamber, with drive transfer from the rolls of the lower chamber to the upper chamber in pressing position by means of cogwheels, belts or other driving means.

I claim:

1. A device (1) for compression of a loose mass, of vegetable fibres, into a compressed round bale (7), the device comprising a frame (2), on which frame is assembled a pressing chamber (5,6) equipped on an internal circumference thereof with rotatable rolls (15), belts, press bars or other pressing devices for rotation and pressing of the bale (7), the pressing chamber (5,6) including an input device (17) for input of the mass into the pressing chamber (5,6), the pressing chamber (5,6) comprising a lower chamber part (5) and an upper chamber part (6) which are displaceable in relation to each other so as to free an area of the bale (7) allowing the bale to be packaged with a web of first packaging material, characterized in that the upper chamber part (6) is rotatably supported in relation to the frame (2) around a vertical axis (9) when the chamber parts are at a distance from each other and an area of the centre of the bale (7) is freed, and that at least one retaining arm (11) is attached to the upper chamber part (6) for a roll (13) of the first packaging material, for packaging of the bale (11) in the web, so that the retaining arm (11) rotates with the upper chamber part (6) and during rotation issues the first packaging material to the bale (7).

2. The device according to claim 1, wherein the frame (2) includes a lower (3) and an upper (4) frame section, the lower pressing chamber part (5) is connected to the lower frame section (3), the upper chamber part (6) is connected to the upper frame section (4), and the two frame sections (3,4) are displaceably connected to each other.

3. Device as claimed in claim 1, characterized in that the part (21) of the lowest chamber (5) with rolls (20) located behind the lowest point of the chamber (5) is lowerable.

4. Device as claimed in claim 1, characterized in that the two sections (3,4) of the frame (2) are interconnected by means of extendible struts, preferably hydraulic cylinders (8).

5. Device as claimed in claim 1, characterized in that the part (21) of the lower chamber (5) with rolls (20) located behind the lowest point of the chamber (5) is lowerable.

6. Device as claimed in claim 5, characterized in that the part (21) of the lower chamber is rotatably supported around a point (19) located approximately at the lowest point of the chamber (5).

7. Device as claimed in claim 1, characterized in that it is equipped with two diametrically arranged retaining arms (11) for rolls of first packaging material (13), so that the balance is maintained during rotation of the arms (11), including fast rotation of same.

8. A device (1) for compression of a loose mass, of vegetable fibres, into a compressed round bale (7), the device comprising a frame (2), on which frame is assembled a pressing chamber (5,6) equipped on an internal circumference thereof with rotatable rolls (15), belts, press bars or other pressing devices for rotation and pressing of the bale (7), the pressing chamber (5,6) including an input device (17) for input of the mass into the pressing chamber (5,6), the pressing chamber (5,6) comprising a lower chamber part (5) and an upper chamber part (6) which are displaceable in relation to each other so as to free an area of the bale to be packaged with a web of first packaging material, characterized in that the frame (2) includes a lower (3) and an upper (4) frame section, that the lower pressing chamber part (5) is connected to the lower frame section (3), that the upper chamber part (6) is connected to the upper frame section (4), and that the two frame sections (3,4) are displaceably connected to each other.

9. Device as claimed in claim 8, characterized in that it is equipped with two diametrically arranged retaining arms (11) for rolls of packaging material (13), so that the balance is maintained during rotation of the arms (11), including fast rotation of same.

10. Device as claimed in claim 1, characterized in that the retaining arm(s) (11) are telescopic.

11. Device as claimed in claim 8, characterized in that the two sections (3, 4) of the frame (2) are interconnected by means of extendible struts, preferably hydraulic cylinders (8).

12. Device as claimed in claim 1, characterized in that at least one holder (18) is arranged outside the pressing chamber (5, 6), the said holder being rotatable around an axis parallel to the longitudinal axis of the chamber (5, 6), for a roll of web-shaped second packaging material, at a width approximately equal to or wider than the width of the compressed body (7), for packaging of the jacket surface and, optionally, the shoulders of the body (7) before packaging of the side surfaces of the body, so that the compressed body becomes nearly airtight on the jacket surface, and so that the compressed body (7) does not disintegrate when the frame sections (5, 6) are separated.

13. Device as claimed in claim 8, characterized in that at least one holder (18) is arranged outside the pressing chamber (5, 6), the said holder being rotatable around an axis parallel to the longitudinal axis of the chamber (5, 6), for a roll of web-shaped second packaging material, at a width approximately equal to or wider than the width of the compressed body (7), for packaging of the jacket surface and, optionally, the shoulders of the body (7) before packaging of the side surfaces of the body, so that the compressed body becomes nearly airtight on the jacket surface, and so that the compressed body (7) does not disintegrate when the frame sections (5, 6) are separated.

14. Device as claimed in claim 11,
   characterized in that the two retaining arms (4) are arranged externally at two opposite sides of the upper pressing chamber part (6).

15. Device as claimed in claim 8, characterized in that the part (21) of the lowest chamber (5) with rolls (20) located behind the lowest point of the chamber (5) is lowerable.

16. The device according to claim 1, wherein the first packaging material comprises an elastic plastic foil.

17. The device according to claim 1, wherein the input device (17) comprises a divider mechanism for dividing the loose mass prior to input into the pressing chamber.

18. The device according to claim 8, wherein the first packaging material comprises an elastic plastic foil.

19. The device according to claim 8, wherein the input device (17) comprises a divider mechanism for dividing the loose mass prior to input into the pressing chamber.

20. The device according to claim 12, wherein the second packaging material comprises an elastic plastic foil.

21. The device according to claim 13, wherein the second packaging material comprises an elastic plastic foil.

* * * * *